(12) United States Patent
Hsieh

(10) Patent No.: US 7,545,633 B2
(45) Date of Patent: Jun. 9, 2009

(54) MODULARIZED COMPUTER

(76) Inventor: Shih-Jie Hsieh, 235 Chung-Ho Box 8-24, Taipei (TW)

( * ) Notice: Subject to any disclaimer, the term of this patent is extended or adjusted under 35 U.S.C. 154(b) by 454 days.

(21) Appl. No.: 11/301,942

(22) Filed: Dec. 14, 2005

(65) Prior Publication Data

US 2007/0133162 A1 Jun. 14, 2007

(30) Foreign Application Priority Data

Dec. 14, 2004 (TW) .............................. 93220089 U

(51) Int. Cl.
*G06F 1/16* (2006.01)
(52) U.S. Cl. ...................................................... 361/683
(58) Field of Classification Search ................. 361/683
See application file for complete search history.

(56) References Cited

U.S. PATENT DOCUMENTS

| 5,774,337 A | * | 6/1998 | Lee et al. ..................... 361/725 |
| 5,973,918 A | * | 10/1999 | Felcman et al. ............. 361/683 |
| 6,040,982 A | * | 3/2000 | Gandre et al. ............... 361/724 |
| 6,108,198 A | * | 8/2000 | Lin .............................. 361/683 |
| 6,301,099 B1 | * | 10/2001 | Felcman et al. ............. 361/683 |
| 6,304,437 B1 | * | 10/2001 | Foo et al. .................... 361/683 |
| 6,411,506 B1 | * | 6/2002 | Hipp et al. .................. 361/686 |
| 6,819,560 B2 | * | 11/2004 | Konshak et al. ............. 361/687 |

\* cited by examiner

*Primary Examiner*—Lisa Lea-Edmonds

(57) ABSTRACT

A modularized computer comprises a main board having a bank slot at a surface thereof, a bottom of the main board having a connecting port, a plurality of inserting slots, and at least one bus slot; a first data accessing unit inserted into the bank slot and being positioned on the main board; a second data accessing unit inserted into the connecting port so as to be positioned at the bottom of the main board; a power module inserted into the inserting slot to be positioned on the main board. The bank slot, the connecting port, a plurality of inserting slots and the at least one bus slot are electrically connected by the circuit on the main board; and a mother board having at least one input/output port is connectable to the bus slot.

4 Claims, 6 Drawing Sheets

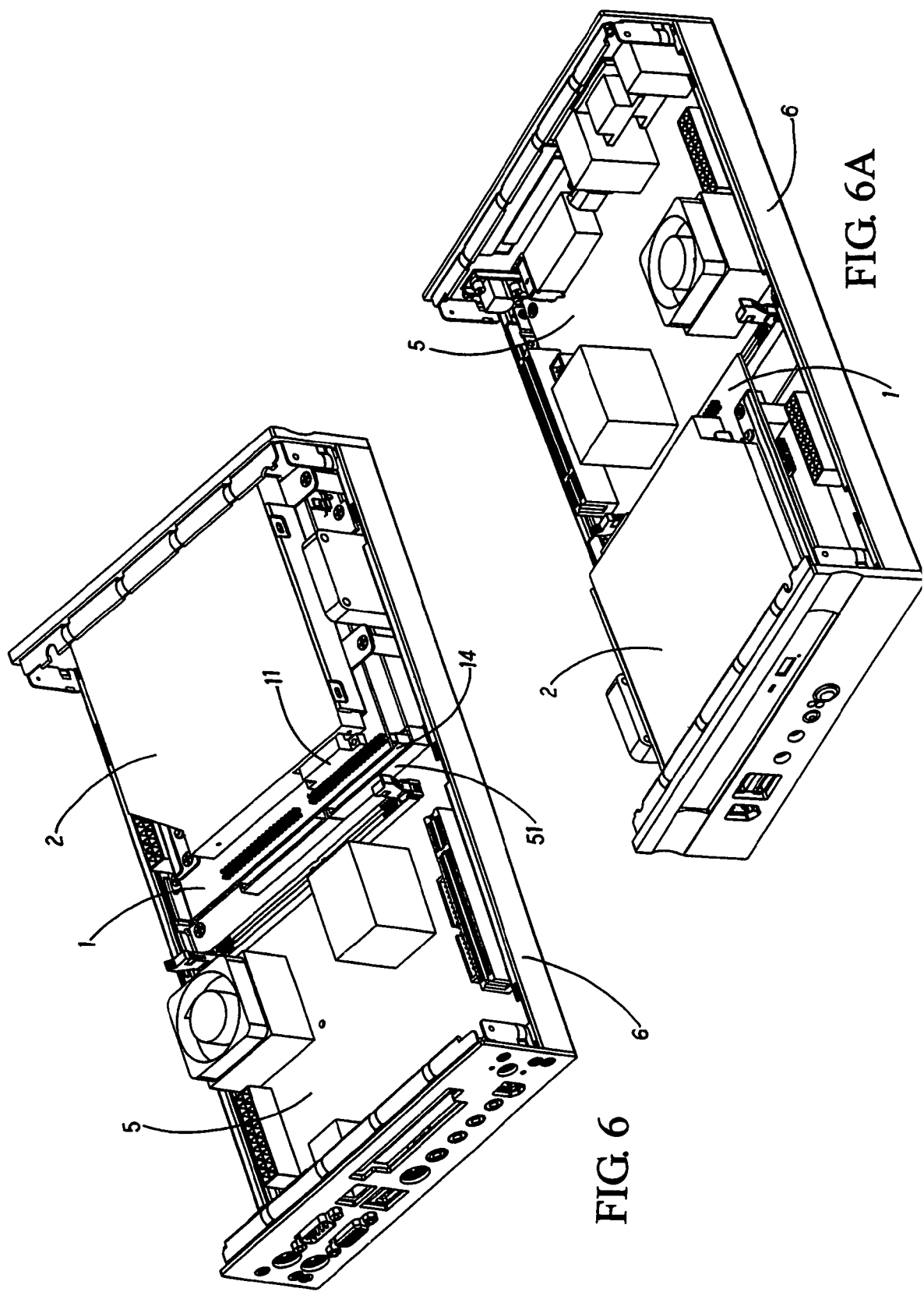

MODULARIZED COMPUTER

FIELD OF THE INVENTION

The present invention relates to computers, and particularly to a modularized computer, wherein the components of the modularized computer is modified by the structural rearrangements by which a main board is installed to various corresponding slots, and the positions and connections of various components of the modularized computer are to be rearranged. Furthermore, The components of the modularized computer is directly connected to the main board thereof so as to offer the functions of offering power and data bidirectionally. The advantages of the present invention are not only to simplify the component structure, but also to avoid complicated circuit arrangements so as to offer the convenience for consumers and satisfy their needs.

BACKGROUND OF THE INVENTION

Generally, a computer is formed by a motherboard, a display and input/output devices (such as a keyboard or a mouse). However the prior art arrangements are determined in the manufacturing process.

Referring to FIG. 1, in one prior art compute mainframe arrangement, a compact disk drive or a hard disk drive is installed at a front surface of a computer casing. A lateral plate serves to install a motherboard. An interface card is inserted into the motherboard. A power module is installed at a rear end of the casing with a window. Thereby above-mentioned elements are connected by bank wires so as to form a computer. This prior art assembly way has been used for a long time and is not changed.

However with the improvement of technology, computers are used as daily work devices. Also, old styles of computer components are substituted continuously by new styles. Because of the improvement of computer components in quality, consumers are encouraged to purchase new style computers. In other hand, the new style components offer opportunity for users to upgrade their computers. Therefore, because manufacturers should consider the needs of consumers in detail so as to causes troubles in preparing materials, assembling, testing and stocks, these manufacturers must provide different options to computer components with various grades for consumers depending on consumer demands. From consumer standpoints, they may face the situations of computer upgrading or maintenance after a time period use. Because layouts of computer circuits are too complicated for people, it is difficult for people to upgrade and maintain computer. Besides, because a computer has a large size and the weight of the computer is heavy, it is inconvenient for users not only to transport the computer to a maintaining center, but also the computer occupies a large space for storage. In above mentioned prior art, computer components are connected each other by bank circuits to form a main board. Several defects are described as the followings. First of all, a manufacturer must increase cost for buying some bank circuits. Secondly, the assembly of the prior art causes chaos in circuits inside the computer casing. Because every component is corresponding both to an independent power circuit and a bank circuit for transmission data to a main board bidirectionally, the computer is ordinarily equipped at least one CD-ROM drive and a hard disk drive for accessing data. Various circuit cause a complicated structure inside the computer casing so as to frustrate the DIY users. Thirdly, a computer system of the prior art is easy to breakdown, because bank circuits are incorrect or has improper connections.

Therefore, it is necessary to redefine and rearrange the positions of components inside a computer so as to reach the goals of convenient use and expansibility.

SUMMARY OF THE INVENTION

Accordingly, the primary object of the present invention is to provide a modularized computer. The modularized computer uses a novel way to resolve problems of manufacturing process and assembly of prior arts, wherein computer components are standardized. By use of a concept of modularizing, the computer components are integrated to a main board and then to form a computer. According to the integrated process, because the main board has corresponding band slots for connecting components to the main board directly, it is unnecessary to use any bank circuit. In addition to the weaknesses of the prior art, the advantages of present invention include cost reduction and space saving. Furthermore, after the components of the modularized computer are connected each other by main board, the processes of power offering and two-way data transmission are completed. In other words, the most important character of present invention is that a power module is connected directly to the main board without needing any bank circuit among power module, main board, first data accessing unit and second data accessing unit so as to maximum computer efficiency.

The second object of the present invention is to provide a modularized computer, wherein the computer components and main board have standard modularization so as to simplify the manufacture process, reduce the cost by mass production, reduce stocks and increase competition in marketing.

The third object of the present invention is to provide a modularized computer, wherein the main board is connected to the components by modularization way so as to reduce y the space of the modularized computer. Also, the modularized computer is convenient to be transported, stored and carried because of small size thereof. Furthermore, computer components of the modularized computer are selective in the assembly work so as to assemble a computer conveniently and easily. The objects of convenient use and satisfaction of users with DIY upgrading and maintain of the modularized computer are reached.

The various objects and advantages of the present invention will be more readily understood from the following detailed description when read in conjunction with the appended drawing.

BRIEF DESCRIPTION OF THE DRAWINGS

FIG. 6 is a schematic view showing that the present invention is placed in a casing.

FIG. 6A is a perspective view showing another view of the present invention.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
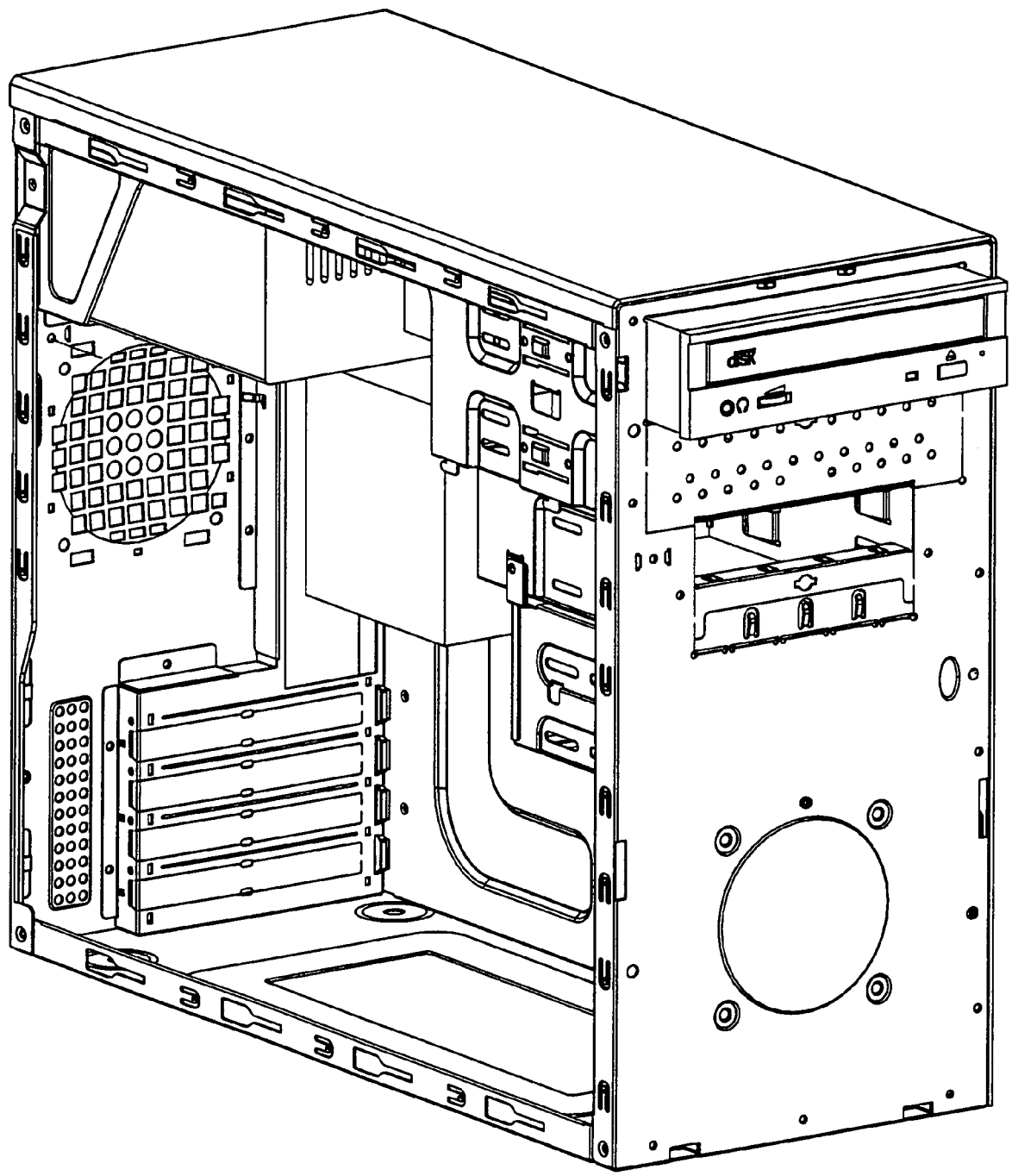
FIG. 1 is a schematic view about the arrangement of a prior art computer.
Figure 2:
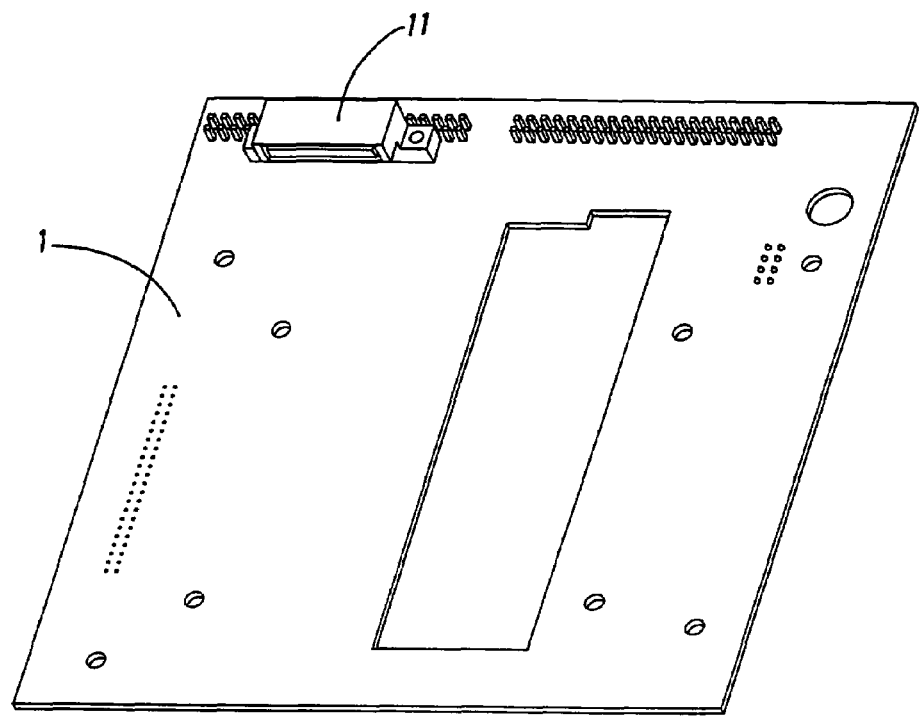
FIG. 2 is a perspective view of the main board of the present invention.
Figure 2A:
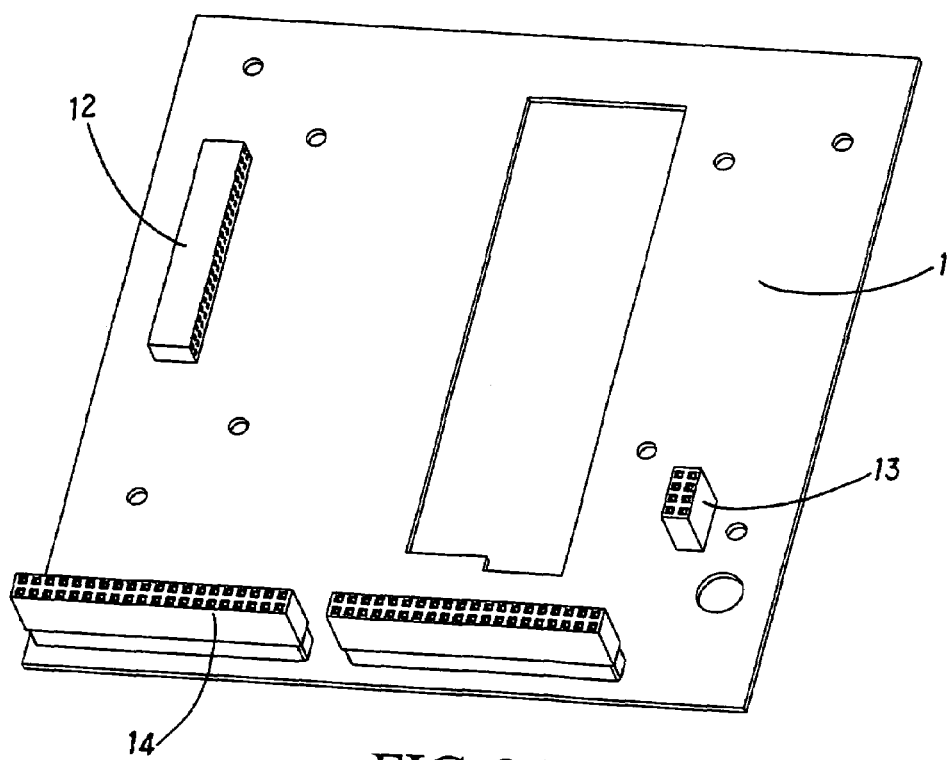
FIG. 2A is a rear perspective view of FIG. 2.
Figure 3:
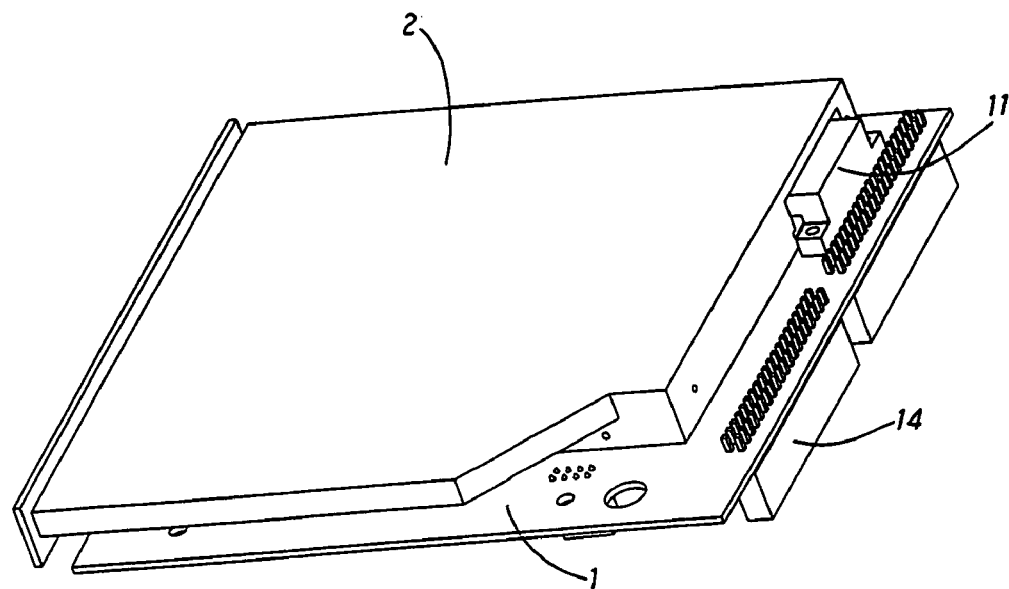
FIG. 3 is a perspective view showing that the first data accessing unit and second data accessing unit are inserted into the main board.
Figure 3A:
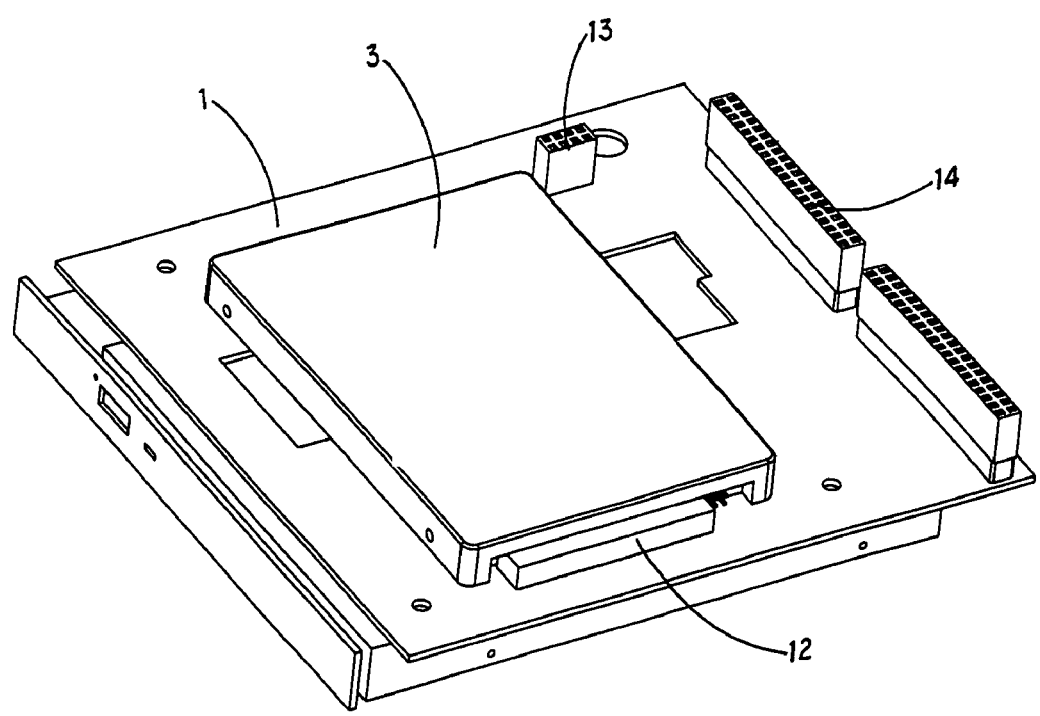
FIG. 3A is a rear perspective view of FIG. 3.

With reference to FIGS. 2 and 3, the present invention is illustrated. The present invention has the following components.

A main board 1 has a bank slot 11 at a surface thereof. A bottom of the main board 1 has a connecting port 12, a plurality of inserting slots 13, and at least one bus slot 14.

A first data accessing unit 2, for example, a compact disk drive, is inserted into the bank slot 11 and is positioned on the main board 1.

A second data accessing unit 3, for example, a hard disk, is inserted into the connecting port 12 so as to be positioned at the bottom of the main board 1.

Figure 4:
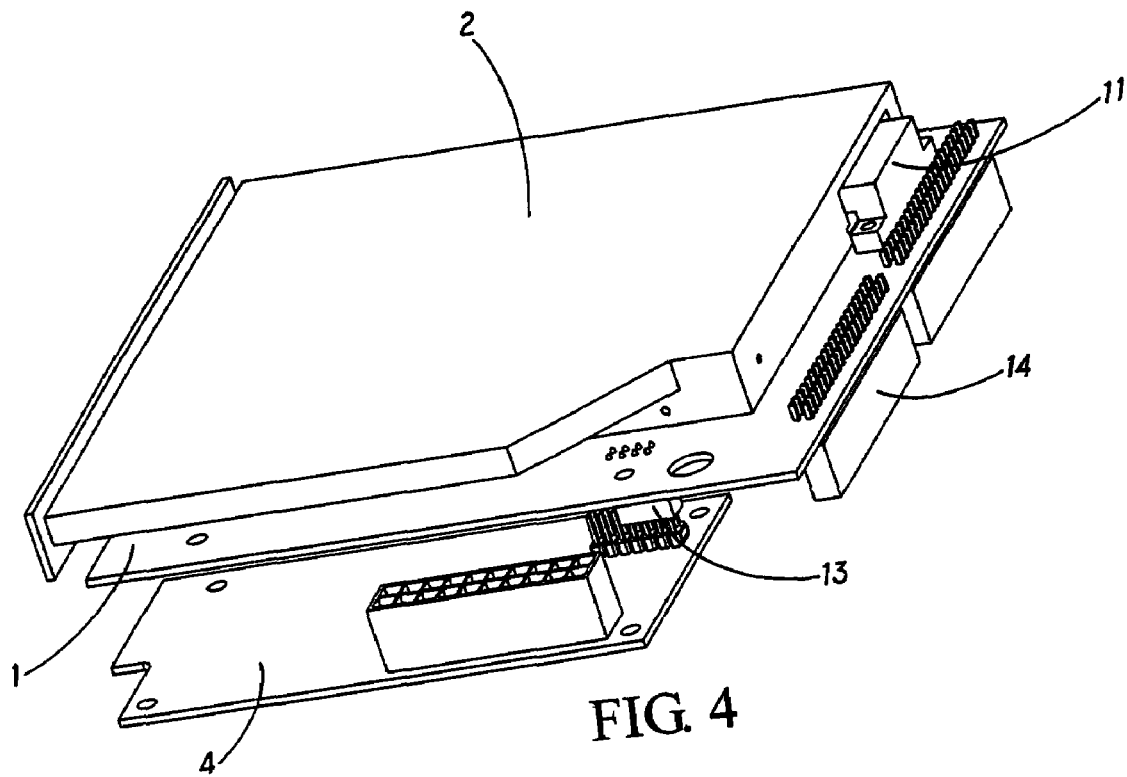
FIG. 4 is a perspective view showing the power module is inserted into the main board according to the present invention.
Figure 4A:
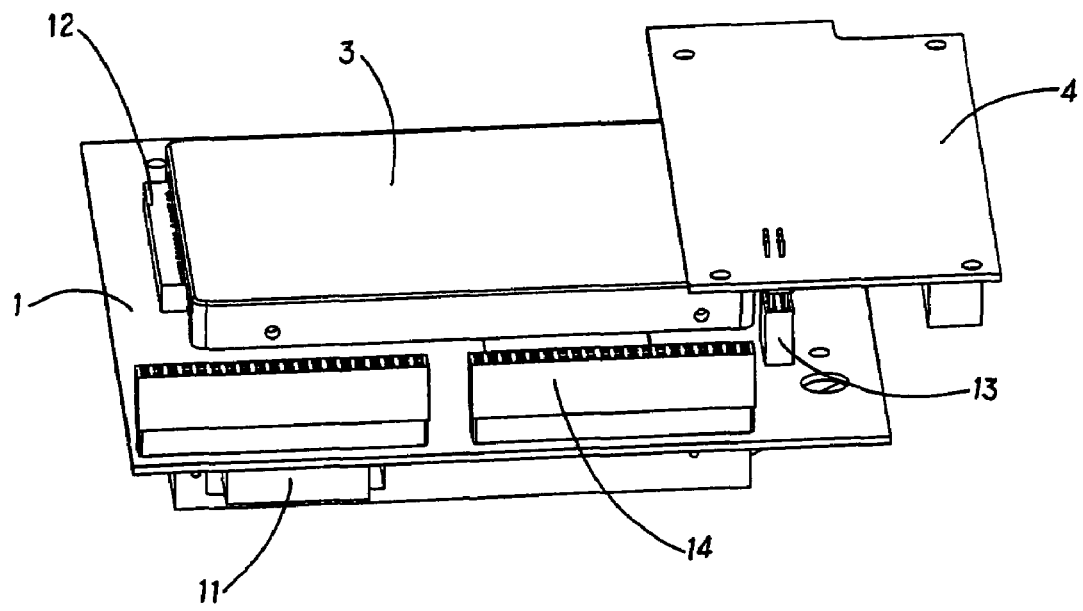
FIG. 4A is a rear view of FIG. 4.

A power module 4 is inserted into the inserting slot 13 so as to be positioned on the main board 1, see FIGS. 4 and 4A, wherein the bank slot 11, the connecting port 12, a plurality of inserting slots 13 and the at least one bus slot 14 are electrically connected by the circuit on the main board 1.

Figure 5:
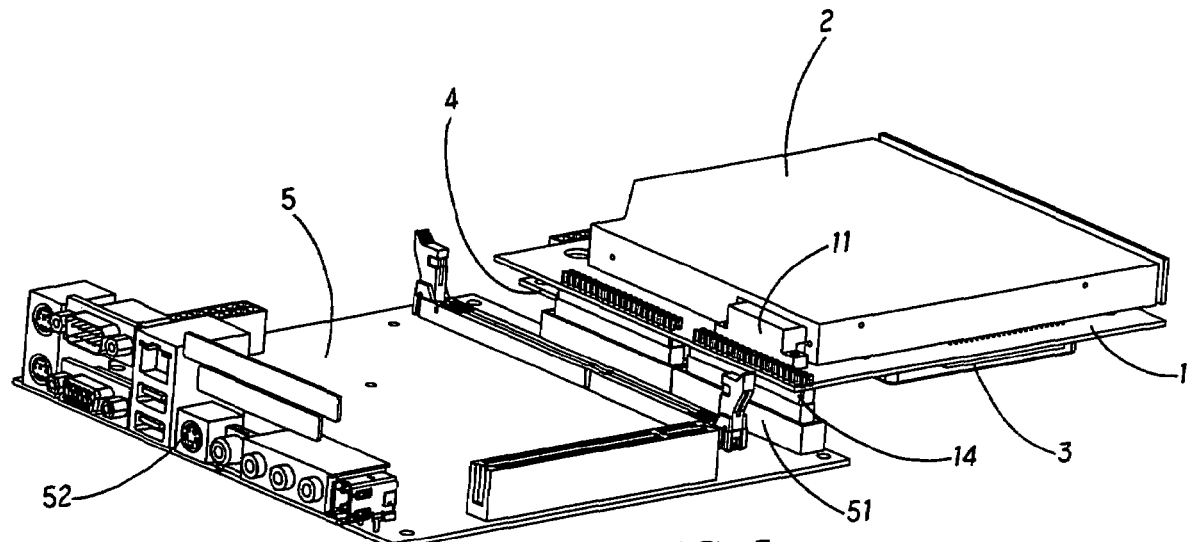
FIG. 5 is a perspective view showing that the mother board is inserted into the main board according to the present invention.
Figure 5A:
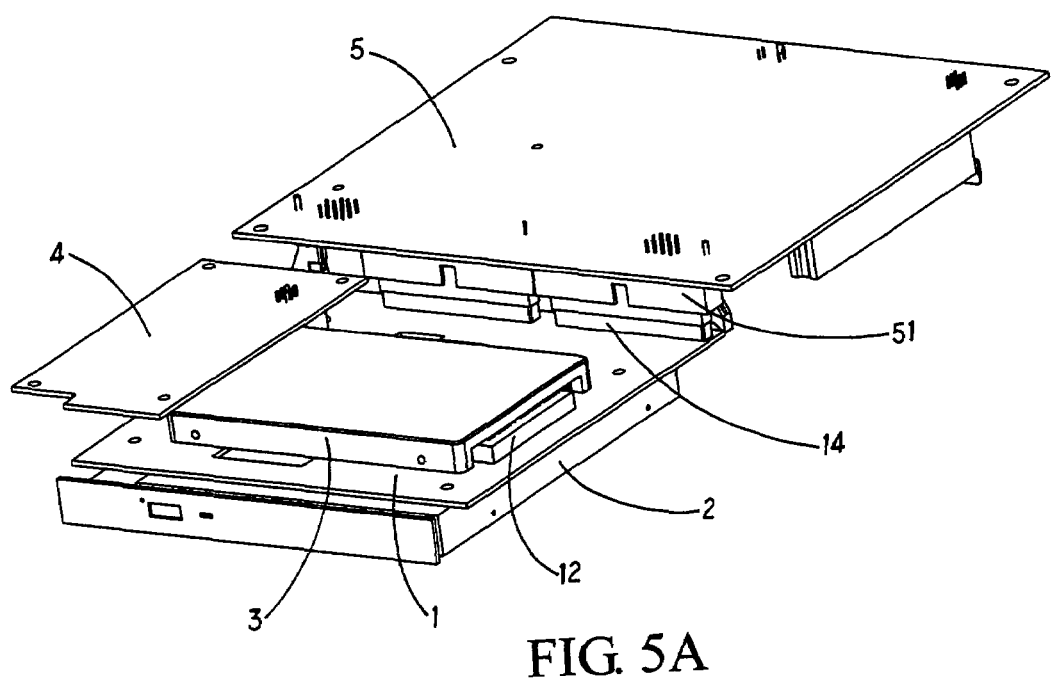
FIG. 5A is a perspective view showing that the mother board is inserted into the main board according to the present invention, which it is viewed from a side opposite to that of FIG. 5.

A motherboard 5 has at least one input/output port 51 and h is connectable with the bus slot 14 (referring to FIGS. 5 and 5A). A rear end of the motherboard 5 is installed with an peripheral devices 52.

Thereby by above mentioned components, the bank slot 11, connecting port 12, a plurality of inserting slots 13, the at least one bus slot 14, the first data accessing unit 2 and the second data accessing unit 3, the power module 4 and the mother board 5 are assembled to the main board 1. Then the assembled structure is placed into a casing 6 so as to form a computer.

By above features, the main board 1 provides the bank slot 11, the connecting port 12, inserting slots 13, and at least one bus slots 14 and a circuit, so that the first data accessing unit 2 and second data accessing unit 3 and mother board 5 are assembled on the main board 1. The power module 4 serves to supply power to all above mentioned components. Thereby no further circuit is necessary to be layout on the main board 1. Thereby the assembly work is convenient.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A modularized computer comprising: a main board (1) having a bank slot (11) at an upper surface thereof; a lower surface of a mother board opposite to the upper surface having a connecting port (12), a plurality of inserting slots (13), and at least one bus slot (14); the mother board (11) having a through hole near a center portion of the mother board; a first data accessing unit (2) being inserted into the bank slot (11) and being positioned on the upper surface of the main board (1); a second data accessing unit (3) being inserted into the connecting port (12) so as to be positioned at the lower side of the main board (1), a power module (4) being inserted into the inserting slot (13) so as to be positioned on the main board (1) and at an upper side of the second data accessing unit (3), wherein the bank slot (11), the connecting port (12), a plurality of inserting slots (13) and the at least one bus slot (14) being electrically connected by the circuit on the main board (1); the motherboard (5) having at least one input/output port being connectable with the bus slot (14) and thus the motherboard (5) and the second accessing unit (3) being at the same side of the main board (1); and a rear end of the motherboard (5) is installed with an peripheral devices (52); and a casing (6); and wherein by above mentioned components, the bank slot (11), connecting port (12), a plurality of inserting slots (13), the at least one bus slot (14), the first data accessing unit (2) and the second data accessing unit (3), the power module (4) and the mother board (5) are assembled to the main board (1); then the assembled structure is placed into a casing (6) so as to form a computer.

2. The modularized computer as claimed in claim 1, wherein each of the first data accessing unit and the second data accessing unit is selected from one of a disk compact, a hard disk drive, a floppy disk, and a CD ROM.

3. The modularized computer as claimed in claim 1, wherein a rear end of the motherboard is installed with at least one peripheral device.

4. The modularized computer as claimed in claim 1, wherein the bank slot, connecting port, a plurality of inserting slots, at least one bus slot, first data accessing unit and second data accessing unit, power module and mother board are assembled to the main board; then they are placed into a casing so as to form a computer.

\* \* \* \* \*